US012680461B1

(12) United States Patent
Richard

(10) Patent No.: US 12,680,461 B1
(45) Date of Patent: Jul. 14, 2026

(54) STATOR VANE SEGMENT FOR AIRCRAFT ENGINE AND METHOD OF PRODUCING THE SAME

(71) Applicant: PRATT & WHITNEY CANADA CORP., Longueuil (CA)

(72) Inventor: François Richard, St-Denis-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/209,019

(22) Filed: May 15, 2025

(51) Int. Cl.
    *F01D 9/04*     (2006.01)
    *B23H 9/10*     (2006.01)

(52) U.S. Cl.
    CPC .............. *F01D 9/041* (2013.01); *B23H 9/10* (2013.01); *F05D 2230/12* (2013.01); *F05D 2230/60* (2013.01); *F05D 2240/12* (2013.01)

(58) Field of Classification Search
    CPC ....... F01D 9/041; B23H 9/10; F05D 2230/12; F05D 2230/60; F05D 2240/12
    See application file for complete search history.

(56) References Cited

U.S. PATENT DOCUMENTS

| | | | | |
|---|---|---|---|---|
| 3,365,173 | A * | 1/1968 | Lynch | F01D 9/042 |
| | | | | 415/209.2 |
| 4,426,191 | A * | 1/1984 | Brodell | F01D 25/246 |
| | | | | 415/199.5 |
| 4,431,373 | A * | 2/1984 | Monsarrat | F01D 25/246 |
| | | | | 415/199.5 |
| 6,910,854 | B2 | 6/2005 | Joslin | |
| 9,453,425 | B2 | 9/2016 | Brummitt-Brown et al. | |
| 10,280,775 | B2 * | 5/2019 | Liebl | F01D 11/005 |
| 11,131,204 | B2 | 9/2021 | Notarnicola et al. | |
| 11,846,193 | B2 * | 12/2023 | Kulinski | F01D 11/04 |
| 2001/0019695 | A1 * | 9/2001 | Correia | F01D 5/143 |
| | | | | 415/138 |
| 2002/0182057 | A1 * | 12/2002 | Liotta | F01D 9/041 |
| | | | | 415/189 |
| 2004/0067131 | A1 * | 4/2004 | Joslin | F01D 5/225 |
| | | | | 415/191 |
| 2009/0053055 | A1 * | 2/2009 | Cornett | F16J 15/0887 |
| | | | | 277/630 |
| 2016/0017740 | A1 * | 1/2016 | McKenna | F01D 9/041 |
| | | | | 416/193 A |

(Continued)

*Primary Examiner* — Aaron R Eastman
(74) *Attorney, Agent, or Firm* — NORTON ROSE FULBRIGHT CANADA LLP

(57) ABSTRACT

A method of manufacturing a stator for a turbine of an aircraft engine, the stator having an inner shroud, an outer shroud, and airfoils extending from the inner shroud to the outer shroud, the method includes: obtaining raw vane segments including inner shroud raw segments, outer shroud raw segments, and airfoils extending from the inner shroud raw segments to the outer shroud raw segments; determining a desired angle defined between chords of the airfoils and a central axis of the stator based on a desired throat area defined between adjacent airfoils; removing material from the inner shroud raw segments and the outer shroud raw segments based on the desired angle to obtain vane segments having inner shroud segments of the inner shroud and outer shroud segments of the outer shrouds; and assembling the vane segments together to obtain the stator by disposing the vane segments circumferentially around the central axis.

14 Claims, 6 Drawing Sheets

(56)                    References Cited

U.S. PATENT DOCUMENTS

| | | | |
|---|---|---|---|
| 2017/0152753 A1* | 6/2017 | Serra | F01D 5/288 |
| 2018/0142564 A1* | 5/2018 | Taglieri | F01D 25/246 |
| 2020/0088056 A1* | 3/2020 | Turner | F01D 11/006 |
| 2021/0010381 A1* | 1/2021 | Azad | F01D 11/006 |
| 2021/0025282 A1 | 1/2021 | Wong et al. | |
| 2024/0167390 A1* | 5/2024 | Lee | F01D 11/005 |
| 2024/0191631 A1* | 6/2024 | Lee | F01D 11/005 |
| 2024/0209776 A1* | 6/2024 | Lawniczek | F01D 5/066 |
| 2025/0137381 A1* | 5/2025 | Picard | F01D 25/005 |

* cited by examiner

40

135

42

41

41

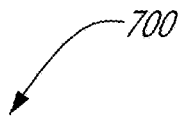

700

| Obtain raw vane segments including inner shroud raw segments, outer shroud raw segments, and airfoils extending from the inner shroud raw segments to the outer shroud raw segments | ~ 702 |

↓

| Determine a desired angle defined between chords of the airfoils and a central axis of the stator based on a desired throat area defined between adjacent airfoils | ~ 704 |

↓

| Remove material from the inner shroud raw segments and the outer shroud raw segments based on the desired angle to obtain vane segments having inner shroud segments of the inner shroud and outer shroud segments of the outer shrouds | ~ 706 |

↓

| Assemble the vane segments together to obtain the stator by disposing the vane segments circumferentially around the central axis. | ~ 708 |

FIG. 7

STATOR VANE SEGMENT FOR AIRCRAFT ENGINE AND METHOD OF PRODUCING THE SAME

TECHNICAL FIELD

The disclosure relates generally to aircraft engines and, more particularly, to systems and methods used to manufacture vanes, such as turbine vanes, of such engines.

BACKGROUND

Aircraft engines, such as gas turbine engines, have turbine sections for extracting energy from hot combustion gases. These turbine sections include successive rotors including blades and stator including vanes. To minimize leakage and hoop stress, the stators may be made of an assembly of vane segments, each including inner and outer shrouds and a plurality of airfoils extending between the inner and outer shrouds. This is satisfactory, but there remains a need for improvement.

SUMMARY

In one aspect, there is provided a method of manufacturing a stator for a turbine of an aircraft engine, the stator having an inner shroud, an outer shroud, and airfoils extending from the inner shroud to the outer shroud, the method comprising: obtaining raw vane segments including inner shroud raw segments, outer shroud raw segments, and airfoils extending from the inner shroud raw segments to the outer shroud raw segments; determining a desired angle defined between chords of the airfoils and a central axis of the stator based on a desired throat area defined between adjacent airfoils; removing material from the inner shroud raw segments and the outer shroud raw segments based on the desired angle to obtain vane segments having inner shroud segments of the inner shroud and outer shroud segments of the outer shrouds; and assembling the vane segments together to obtain the stator by disposing the vane segments circumferentially around the central axis.

The method described above may include any of the following features, in any combinations.

In some embodiments, the obtaining of the raw vane segments includes obtaining the raw vane segments each including a single airfoil.

In some embodiments, the removing of the material from the inner shroud raw segments and the outer shroud raw segments includes: removing material from opposite inner and outer lateral faces of the inner shroud raw segments and the outer shroud raw segments to obtain the desired angle; and removing material from faces extending between the opposite inner and outer lateral faces such that the faces face a direction being devoid of a circumferential component relative to the central axis.

In some embodiments, the removing of the material from the inner shroud raw segments and the outer shroud raw segments includes machining interlocking features in the inner shroud segments and the outer shroud segments.

In some embodiments, the machining of the interlocking features includes machining male members on first inner lateral faces of the inner shroud segments and on first outer lateral faces of the outer shroud segments and machining female members on second inner lateral faces opposite the first inner lateral faces and on second outer lateral faces opposite the first outer lateral faces.

In some embodiments, the machining of the interlocking features includes machining the interlocking features using a wire-electrical discharge machining method.

In some embodiments, the machining of the male members includes machining half-firtrees, the machining of the female members includes machining half-firtree slots.

In some embodiments, the half-firtrees and the half-firtree slots are engageable within each other in a circumferential direction relative to the central axis.

In some embodiments, the half-firtrees and the half-firtree slots are engageable within each other in an axial direction relative to the central axis.

In some embodiments, the removing of the material from the inner shroud raw segments and the outer shroud raw segments further includes machining slots in first inner lateral faces of the inner shroud segments, first outer lateral faces of the outer shroud segments, second inner lateral faces opposite the first inner lateral faces, and second outer lateral faces opposite the first outer lateral faces.

In some embodiments, the assembling of the vane segments includes inserting feather seals in the slots.

In some embodiments, the assembling of the vane segments includes abutting each of the inner shroud segments against two adjacent ones of the inner shroud segments and abutting the outer shroud segments against two adjacent ones of the outer shroud segments.

In some embodiments, the method includes installing the stator in a turbine section of the aircraft engine, the aircraft engine being devoid of variable guide vanes in the turbine section.

In some embodiments, the determining of the desired angle includes determining a first angle and a second angle different than the first angle, the removing of the material includes: obtaining first vane segments having the first angle by removing material from first inner shroud raw segments of the inner shroud raw segments and first outer shroud raw segments of the outer shroud raw segments; and obtaining second vane segments having the second angle by removing material from second inner shroud raw segments of the inner shroud raw segments and second outer shroud raw segments of the outer shroud raw segments, the assembling of the vane segments includes: assembling the first vane segments and the second vane segments in alteration around the central axis to obtain a mistuned stator.

In another aspect, there is provided a stator for an aircraft engine, comprising: segments circumferentially distributed around a central axis, a segment of the segments having: an inner shroud having opposed outer inner lateral faces extending mainly axially and configured to abut adjacent segments of the segments, and opposed front and rear inner faces extending circumferentially; an outer shroud defining opposed outer lateral faces extending mainly axially and configured to abut the adjacent segments, and opposed front and rear outer faces extending circumferentially; and a single airfoil extending from the inner shroud to the outer shroud, wherein the opposed outer lateral faces and the opposed inner lateral faces of the segment are non-parallel to the central axis.

The stator described above may include any of the following features, in any combinations.

In some embodiments, the stator is a turbine stator.

In some embodiments, the single airfoil defines a first angle between a chord of the single airfoil and the central axis, another segment of the segments having an airfoil defining a second angle between a chord of the airfoil and the central axis, the first angle different than the second angle.

In some embodiments, the stator includes interlocking features between the segments.

In some embodiments, the interlocking features including half-firtrees at one of the opposed outer lateral faces and at one of the opposed inner lateral faces and half-firtree slots at the other of the opposed outer lateral faces and at the other one of the opposed inner lateral faces.

In some embodiments, the segments are engageable to one another in an axial direction relative to the central axis.

DESCRIPTION OF THE DRAWINGS

Reference is now made to the accompanying figures in which:

FIG. 7 is a flowchart illustrating steps of a method of manufacturing a stator for the gas turbine engine of FIG. 1.

DETAILED DESCRIPTION

Figure 1:
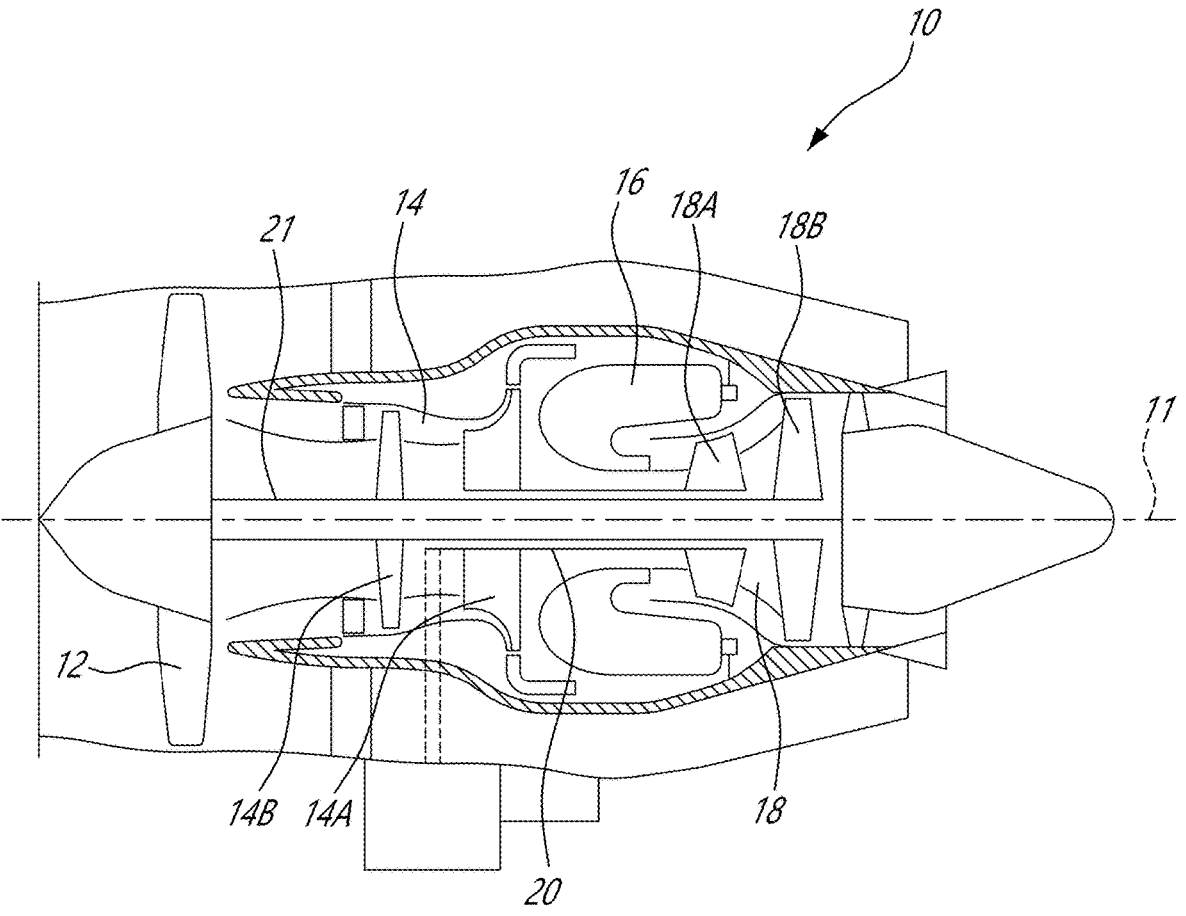
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and other heat engines, such as piston and rotary engines without departing from the scope of the present disclosure.

Figure 2:
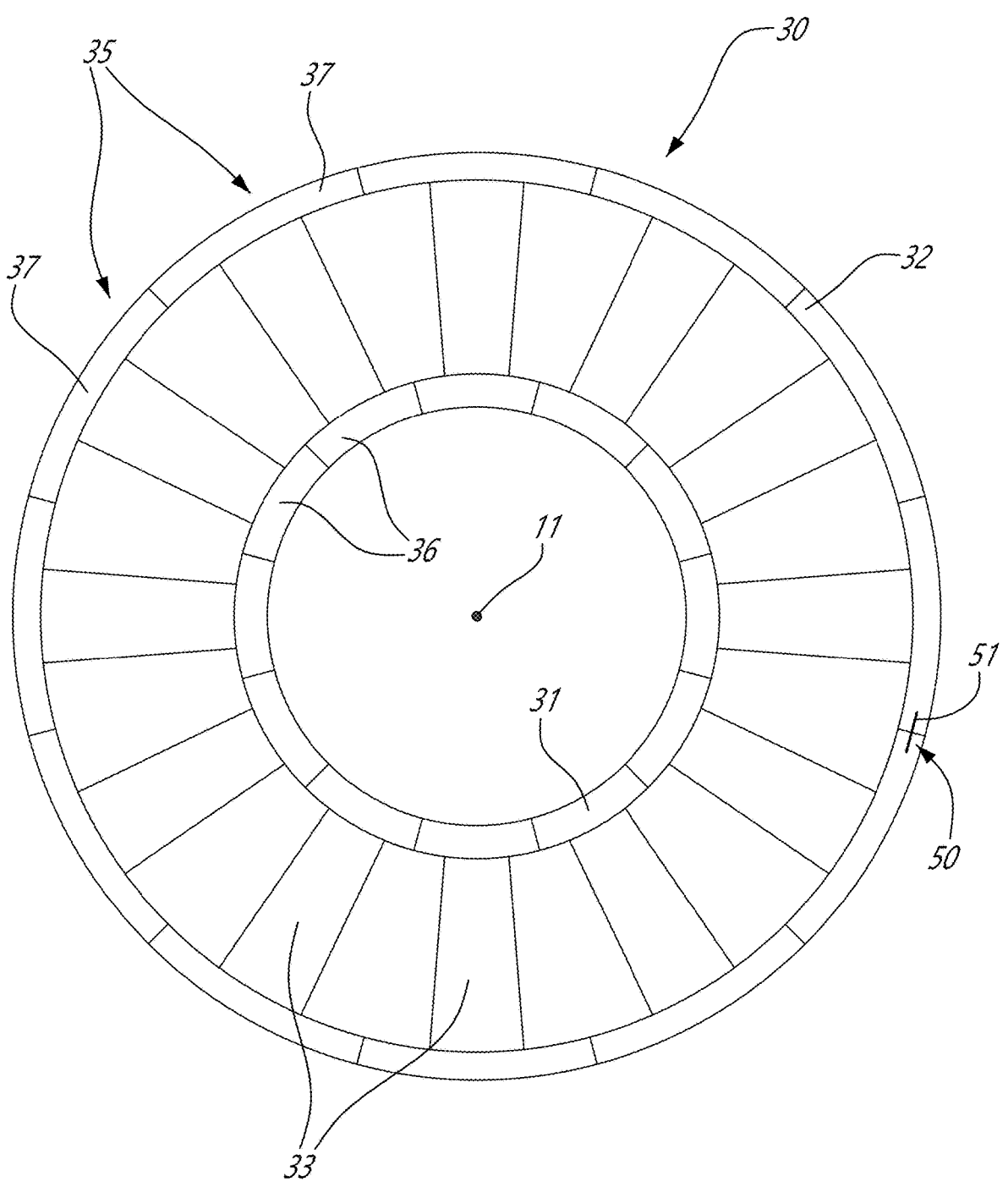
FIG. 2 is a front view of a stator for a turbine section of the gas turbine engine of FIG. 1.

Referring now to FIG. 2, the turbine section 18 is described in more detail. The turbine section 18 includes successive rows of stators and rotors disposed in alternation along the central axis 11. One of the stator is shown at 30 in FIG. 2. It will be appreciated that the principles of the present disclosure may also apply to compressor stators. As depicted, the stator 30 includes an inner shroud 31, and outer shroud 32 disposed radially outwardly of the inner shroud 31 relative to the central axis 11, and a plurality of airfoils 33 extending from the inner shroud 31 to the outer shroud 32 and circumferentially distributed around the central axis 11.

Typically, turbine stators are made of a plurality of segments each including from two to four, typically three, airfoils. The objective in having separate stator segments is to minimize hoop stress caused by temperature growth, and to minimize risks of self-induced cracking due to thermal distortion (e.g., buckling). However, gaps between those stator segments creates locations where a working fluid, such as combustion gases, may leak out of a gaspath. To alleviate this leakage, feather seals are disposed within those gaps to seal them.

In the embodiment shown, the gas turbine engine 10 is devoid of variable guide vanes downstream of the combustor 16. Variable guide vanes may be pivoted about their respective spanwise axes to change a throat area between each pair of adjacent vanes. The throat area controls the pressure ratio and mass flow rate of the gas turbine engine 10. In fixed vane turbine stator embodiments, the throat area is not adjustable and, thus, care should be taken to ensure that the throat area is adequately set. To ensure adequate performance and to provide flexibility, a plurality of castings may be used, referred to as a "class". The castings of different classes differ from one another by the "w" angle, which may be defined as the angle between an incoming flow and a chord of airfoils of the stator. Upon testing the gas turbine engine 10 during manufacturing, the adequate "w" angle is determined and the stator is assembled using the segments of the appropriate class. However, this creates a significant supply management situation requiring expensive tooling and yield issues that result in high cost and on-time delivery challenges. A layout process is needed to inspect the large number of class combinations. This is time consuming and costly since one layout is required for every class. The addition of complex cooling hole patterns and high temperature coatings only further complicates the manufacturing process. More specifically, in smaller gas turbine engines, it may be difficult to machine cooling holes through the airfoils when more then one airfoil is present on a single stator segment since some locations on some airfoils may be impeded by the adjacent airfoils. As will be seen hereinafter, some embodiments of the stator 30 of the present disclosure may at least partially alleviate the aforementioned drawbacks. For example, as will be discussed below in connection with some embodiments, the present disclosure proposes to use individual segments having a single airfoil and a single casting shape. Subsequent machining is performed on the individual segments to obtain the desired "w" angle. More detail are presented below.

Figure 3:
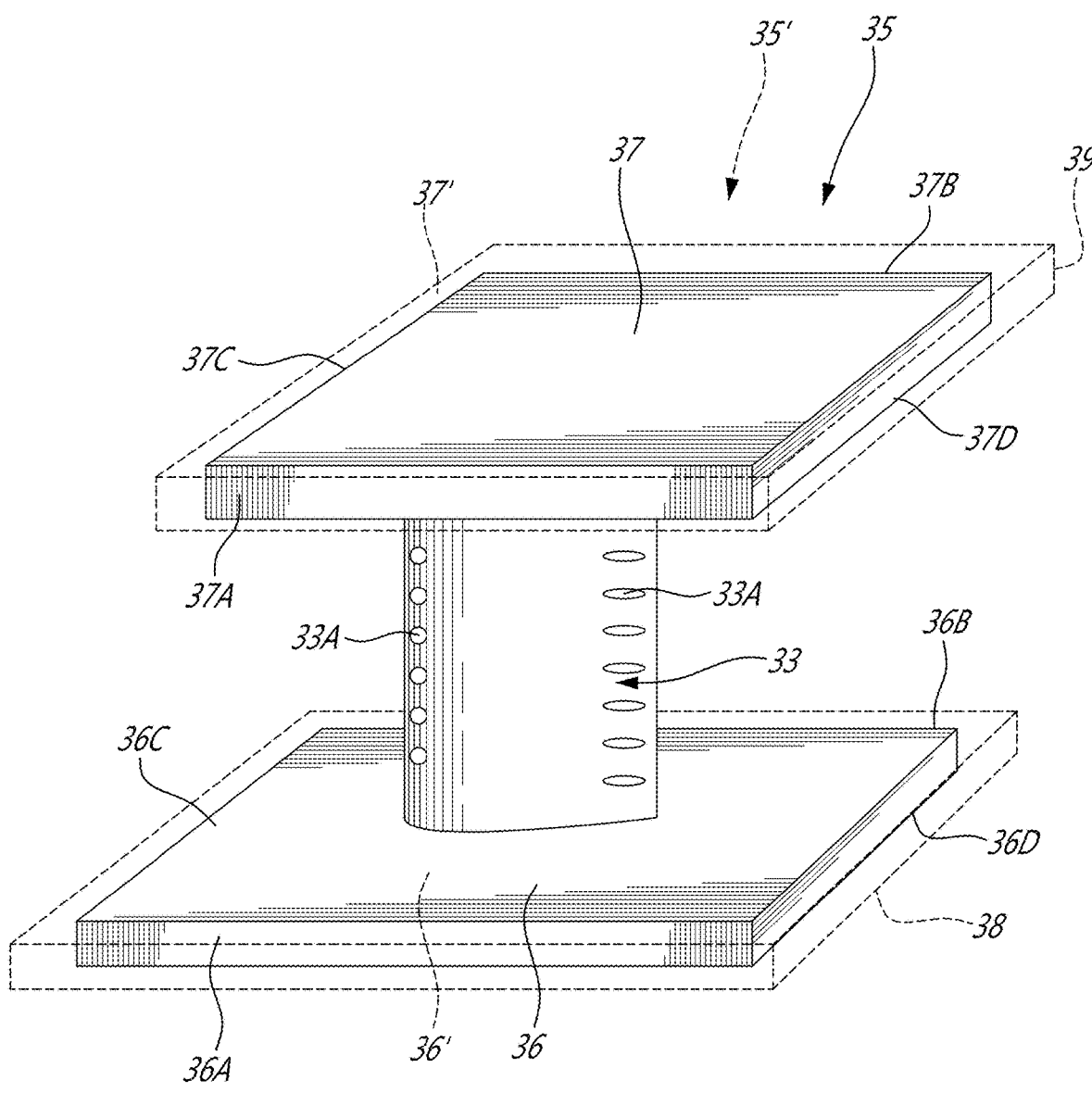
FIG. 3 is a three-dimensional view of a segment of the stator of FIG. 2.

Referring to FIGS. 2-3, as shown, the stator 30 includes a plurality of segments 35 each including an inner shroud segment 36, an outer shroud segment 37, and one of the airfoils 33. In some cases, one or more segments 35 of stator 30 may include more than one airfoil 33. The inner shroud 31 is therefore an assembly of the inner shroud segments 36, whereas the outer shroud 32 is an assembly of the outer shroud segments 37.

FIG. 3 illustrates one of the segments 35. The exemplified segment 35 is a single monolithic body defining an inner shroud segment 36, an outer shroud segment 37, and an airfoil 33. The airfoil 33 may define cooling holes 33A, which may be used for film cooling. The inner shroud segment 36 includes an inner front axial face 36A facing an axially forward direction relative to the central axis 11, an inner rear axial face 36B opposite the inner front axial face 36A, an inner first lateral face 36C, and an inner second lateral face 36D opposed to the inner first lateral face 36C. The lateral faces extend between the axial faces. Similarly, the outer shroud segment 37 includes an outer front axial face 37A facing an axially forward direction relative to the central axis 11, an outer rear axial face 37B opposite the outer front axial face 37A, an outer first lateral face 37C, and an outer second lateral face 37D opposed to the outer first lateral face 37C.

As shown in FIG. 3, the segments 35 are manufactured from raw segments with excess material, which may be referred to as machining allowance. These raw segments are labelled 35' with a dashed line in FIG. 3. The excess material may be referred to as an inner peripheral machining allowance 38 and an outer peripheral machining allowance 39, which are both illustrated with dashed lines in FIG. 3. Hence, the raw segment 35' includes the airfoil 33, an inner shroud raw segment 36' and an outer shroud raw segment 37', which are both referred to with a dashed line. The inner shroud segment 36 and the outer shroud segment 37 are obtained after machining the inner peripheral machining allowance 38 and the outer peripheral machining allowance 39 of the inner shroud raw segment 36' and the outer shroud raw segment 37'. In some embodiments, the airfoil 33 may also be in a raw shape and some machining (e.g., boring holes, polishing, etc.) may be needed to bring it to its final shape. Alternatively, the airfoil 33 may already be in its final shape. These machine allowances or extra layers are configured to be machined away with any suitable method, such as grinding and wire-EDM (electrical discharge machining). In so doing, it is possible to adjust those segments 35 to obtain the desired "w" angle.

Figure 4:
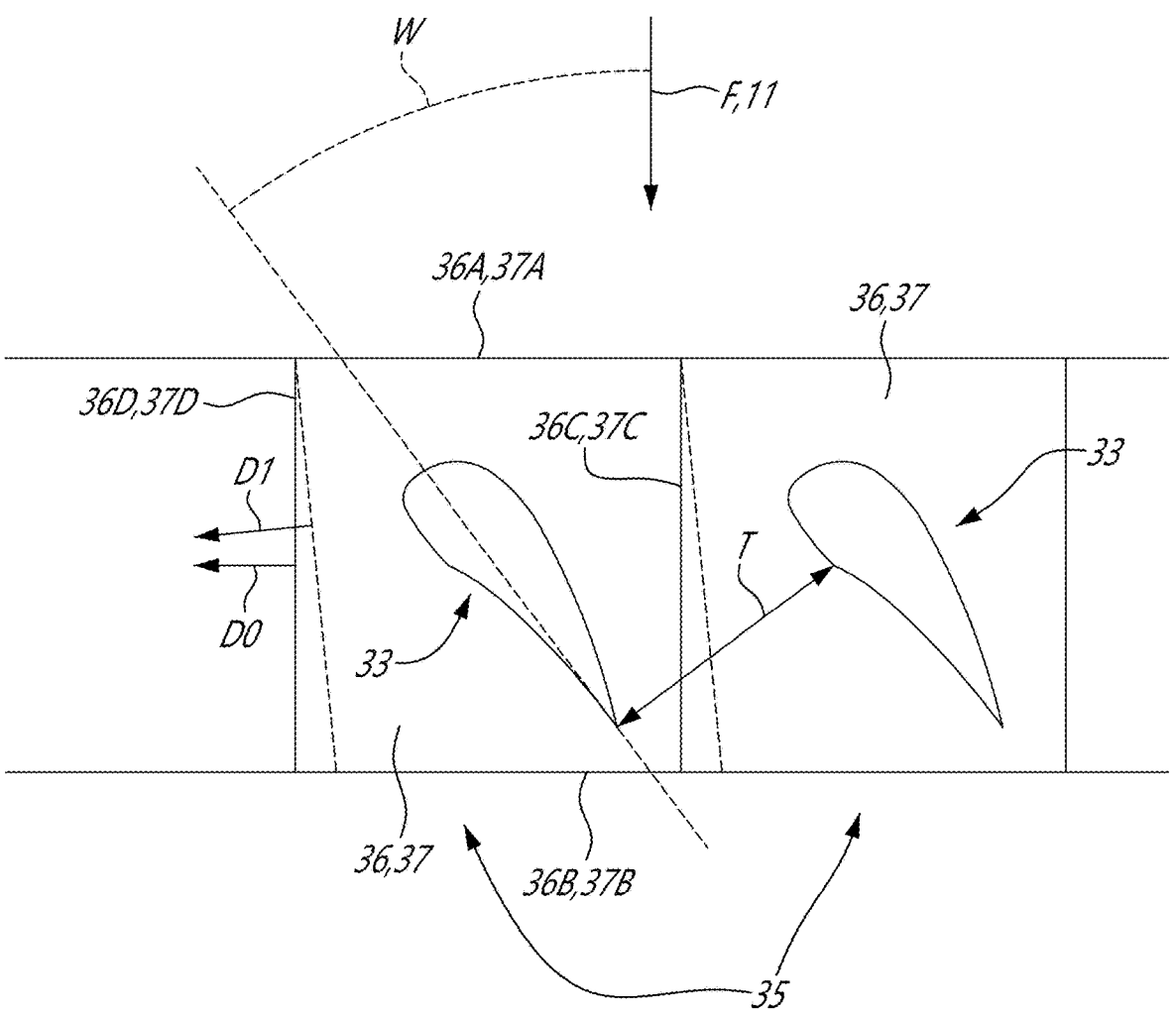
FIG. 4 is a spanwise cross-sectional view of the stator of FIG. 2.

Referring more particularly to FIG. 4, two adjacent segments 35 are illustrated. The inner peripheral machining allowance 38 and the outer peripheral machining allowance 39 of the raw segments 35' (FIG. 3) are machined in a way to yield the desired "w" angle when the segments 35 are assembled to form the stator 30. More specifically, the raw segments may be manufactured such that the airfoil 33 has a baseline "w" angle if the inner peripheral machining allowance 38 and the outer peripheral machining allowance 39 are machined to yield the inner and outer lateral faces 36C, 37C, 36D, 37D facing baseline directions D0 being devoid of an axial component, that is, mainly circumferential. In the context of the present disclosure, the expression "mainly" when referring to a direction implies 50% or more. The direction D0 may include a radial component if these faces are slanted. These faces are depicted with solid lines in FIG. 4.

However, in some cases it may be desired to have a "w" angle that is different from the baseline "w" angle. To do so, the inner peripheral machining allowance 38 and the outer peripheral machining allowance 39 are machined such that the "w" angles matches the desired angle. Consequentially, the inner and outer lateral faces 360, 37C, 36D, 37D face modified direction D1 that includes an axial component relative to the central axis 11. It may be desirable that the inner and outer front and rear axial faces 36A, 37A, 36B, 37B are devoid of a circumferential component relative to the central axis 11. Indeed, these faces will be oriented towards adjacent rotors and, thus, it may be desirable that these faces are devoid of a circumferential component to permit rotation of the adjacent rotors. Hence, the inner peripheral machining allowance 38 and the outer peripheral machining allowance 39 are machined to ensure that the inner and outer front and rear axial faces 36A, 37A, 36B, 37B face directions that are devoid of a circumferential component relative to the central axis 11. In some embodiments, the shape of the inner and outer shroud segments may be substantially square or rectangular when the "w" angle corresponds to the baseline "w" angle and may be shaped as parallelograms when the "w" angle differs from the baseline "w" angle.

Figure 5:
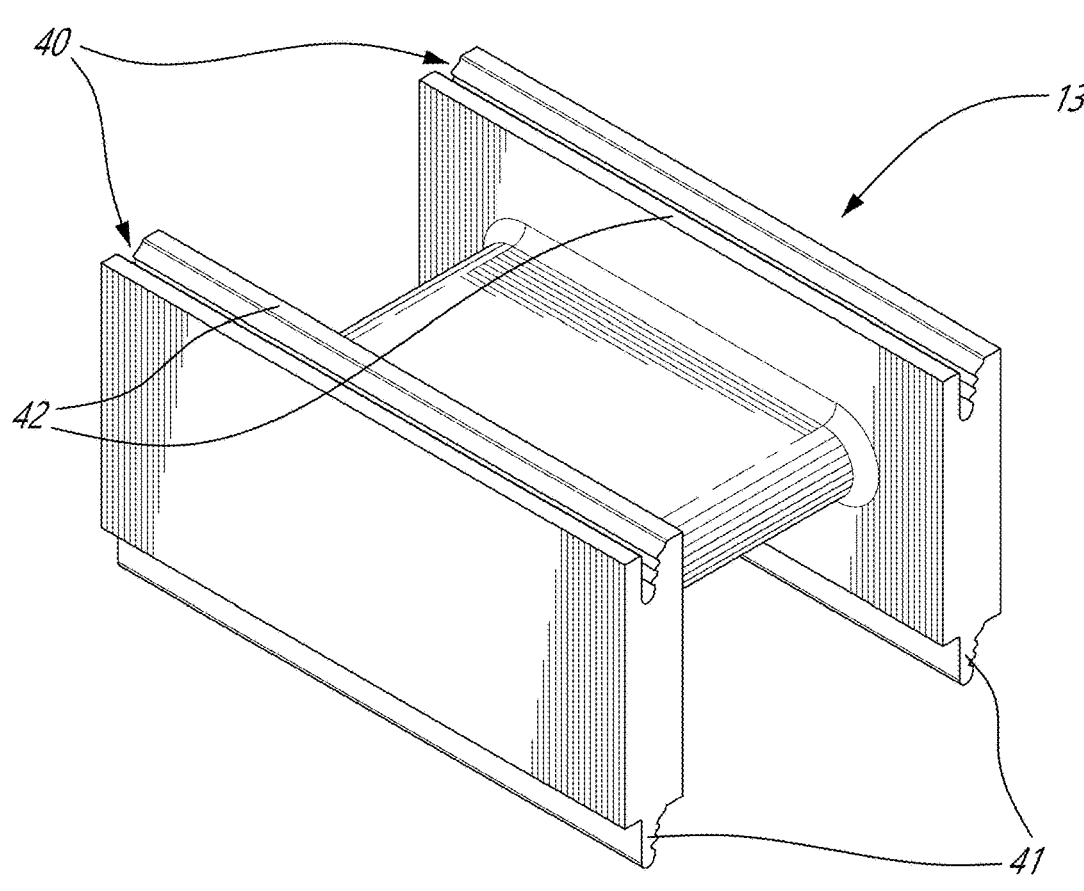
FIG. 5 is a three-dimensional view of a segment in accordance with some embodiments.
Figure 6:
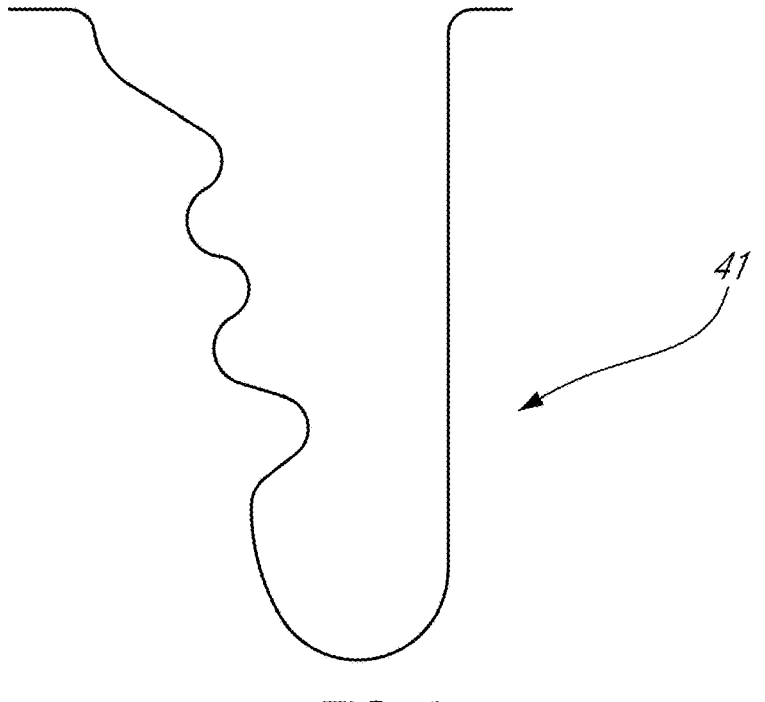
FIG. 6 is a front view of a portion of the segment of FIG. 5 illustrating an interlocking feature.

Referring to FIGS. 5-6, another embodiment of the vane segment is shown at 135. In conjunction with the features described above, only features different from the segments described above are described. In some embodiments, the lateral faces 36C, 36D, 37C, 37D may define interlocking features 40, which may include male members 41 and female members 42; the male members 41 being receivable within the female members 42. In some embodiments, the male members 41 may be firtrees, or half-firtrees as depicted and the female members 42 may be complementary firtree slots, or complementary half-firtrees slots as illustrated. The male and female members 41, 42 may be designed to be insertable one within the other in one or more of an axial and circumferential directions relative to the central axis 11. The firtrees may include successive crests and valleys to create an interlocking engagement between the male and female members.

Referring now to FIG. 7, a method of manufacturing the stator 30 is shown at 700. The method 700 includes obtaining the raw vane segments 35' including the inner shroud raw segments 36', the outer shroud raw segments 37', and the airfoils 33 extending from the inner shroud raw segments 36' to the outer shroud raw segments 37' at 702; determining a desired angle defined between chords of the airfoils 33 and the central axis 11 of the stator 30 at 704; removing material from the inner shroud raw segments 36' and the outer shroud raw segments 37' based on the desired angle to obtain the vane segments 35 having the inner shroud segments 36 and the outer shroud segments 37 at 706; and assembling the vane segments 35 together to obtain the stator 30 by disposing the vane segments 35 circumferentially around the central axis 11 at 708.

In some embodiments, the obtaining of the raw vane segments 35' at 702 includes obtaining the raw vane segments 35' each including a single one of the airfoils 33.

The determining of the desired angle at 704 may include determining the desired angle based on a desired throat area T (FIG. 4) defined between the adjacent airfoils 33.

In some embodiments, the removing of the material from the inner shroud raw segments 36' and the outer shroud raw segments 37' at 706 includes: removing material from opposite inner and outer lateral faces 360, 36D, 37C, 37D of the inner shroud raw segments 36' and the outer shroud raw segments 37' to obtain the desired angle; and removing material from the front and rear inner and outer faces 36A, 36B, 37A, 37B extending between the opposite inner and outer lateral faces 36C, 36D, 37C, 37D such that the front and rear inner and outer faces 36A, 36B, 37A, 37B face a direction being devoid of a circumferential component relative to the central axis 11.

As shown in FIGS. 5-6, the removing of the material from the inner shroud raw segments 36' and the outer shroud raw segments 37' at 706 may include machining the interlocking features 40 in the inner shroud segments 36 and the outer shroud segments 37. These interlocking features 40 may be used to interconnect adjacent segments together and may be used to seal gaps defined between the adjacent segments. Alternatively, feather seals may be used. The machining of the interlocking features 40 may include machining the male members 41 on first inner lateral faces 36C of the inner shroud segments 36 and on first outer lateral faces 37C of the outer shroud segments 37 and machining the female members 42 on second inner lateral faces 36D opposite the first inner lateral faces 36C and on second outer lateral faces 37D opposite the first outer lateral faces 37C. The machining of the interlocking features 40 may include machining the interlocking features 40 using a wire-electrical discharge machining method. The machining of the male members 41 may include machining half-firtrees, the machining of the female members 42 includes machining half-firtree slots.

Alternatively, the removing of the material from the inner shroud raw segments and the outer shroud raw segments further includes machining slots in first inner lateral faces of the inner shroud segments, first outer lateral faces of the outer shroud segments, second inner lateral faces opposite the first inner lateral faces, and second outer lateral faces opposite the first outer lateral faces. The assembling of the vane segments 35 may include inserting feather seals 51 (FIG. 2) in the slots 50.

As shown in FIG. 2, the assembling of the vane segments 35 includes abutting each of the inner shroud segments against two adjacent ones of the inner shroud segments and abutting the outer shroud segments against two adjacent ones of the outer shroud segments. Then, the assembled stator may be installed in the turbine section 18 of the gas turbine engine 10.

Some embodiments of the stator may provide a more efficient sealing between adjacent segments to minimize leakage. Using segments having a single airfoil may allow more precise machining (e.g., milling, grinding, etc.) to provide the desired "w" angle. It may be possible to mistune the stator 30 by providing the stator with different "w" angles. For instance, the airfoils 33 may include first and second airfoils differing by their "w" angles and disposed in alternation around the central axis 11. Efficiency gains in engine manufacturing may be achieved since the same airfoil geometry may be used for different engine variants. This may maximize volume and reduce non-recurring and quality costs. Once machined, these segments may be assembled in a way that limits leakage, but allows minimal movement of the airfoils to cope with thermally induced stresses. The use of the disclosed male and female members having half-firtree shape may provide a superior, yet flexible joint, and may allow machining by wire-EDM to generate a jigsaw-like assembly. Given the centrifugal forces, only the external portion of the attachment feature may need to have the interlocking/sealing geometry. Other non-linear geometries may be used for the attachment feature.

In some embodiments, the method 700 may be used to manufacture a mistuned stator. In this case, the determining of the desired angle at 704 include determining a first angle and a second angle different than the first angle. The removing of the material at 706 includes: obtaining first vane segments having the first angle by removing material from first inner shroud raw segments of the inner shroud raw segments and first outer shroud raw segments of the outer shroud raw segments; and obtaining second vane segments having the second angle by removing material from second inner shroud raw segments of the inner shroud raw segments and second outer shroud raw segments of the outer shroud raw segments. The assembling of the vane segments at 708 includes: assembling the first vane segments and the second vane segments in alteration around the central axis to obtain a mistuned stator.

It is noted that various connections are set forth between elements in the preceding description and in the drawings. It is noted that these connections are general and, unless specified otherwise, may be direct or indirect and that this specification is not intended to be limiting in this respect. The term "connected" or "coupled to" may therefore include both direct coupling and indirect coupling.

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The invention claimed is:

1. A method of manufacturing a stator for a turbine of an aircraft engine, the stator having an inner shroud, an outer shroud, and airfoils extending from the inner shroud to the outer shroud, the method comprising:

obtaining raw vane segments including inner shroud raw segments, outer shroud raw segments, and airfoils extending from the inner shroud raw segments to the outer shroud raw segments, the inner shroud raw segments and the outer shroud raw segments having opposite inner and outer lateral faces facing baseline directions defining baseline angles with the central axis of the stator, chords of the airfoils defining raw angles with a central axis of the stator;

determining a desired angle defined between the chords of the airfoils and the central axis of the stator based on a desired throat area defined between adjacent airfoils;

removing material from the inner and outer lateral faces of the inner shroud raw segments and the outer shroud raw segments based on the desired angle to change the baseline directions of the inner and outer lateral faces to obtain vane segments having inner shroud segments of the inner shroud and outer shroud segments of the outer shrouds, including changing the raw angles defined between the chords of the airfoil and the central axis to the desired angle by changing angles defined between the central axis and directions normal to the inner and outer lateral faces; and assembling the vane segments together to obtain the stator by disposing the vane segments circumferentially around the central axis.

2. The method of claim 1, wherein the obtaining of the raw vane segments includes obtaining the raw vane segments each including a single airfoil.

3. The method of claim 1, wherein the removing of the material from the inner shroud raw segments and the outer shroud raw segments includes:

removing material from faces extending between the opposite inner and outer lateral faces such that the faces face a direction being devoid of a circumferential component relative to the central axis.

4. The method of claim 1, wherein the removing of the material from the inner shroud raw segments and the outer shroud raw segments includes machining interlocking features in the inner shroud segments and the outer shroud segments.

5. The method of claim 4, wherein the machining of the interlocking features includes machining male members on first inner lateral faces of the inner shroud segments and on first outer lateral faces of the outer shroud segments and machining female members on second inner lateral faces opposite the first inner lateral faces and on second outer lateral faces opposite the first outer lateral faces.

6. The method of claim 5, wherein the machining of the interlocking features includes machining the interlocking features using a wire-electrical discharge machining method.

7. The method of claim 5, wherein the machining of the male members includes machining half-firtrees, the machining of the female members includes machining half-firtree slots.

8. The method of claim 7, wherein the half-firtrees and the half-firtree slots are engageable within each other in a circumferential direction relative to the central axis.

9. The method of claim 7, wherein the half-firtrees and the half-firtree slots are engageable within each other in an axial direction relative to the central axis.

10. The method of claim 1, wherein the removing of the material from the inner shroud raw segments and the outer shroud raw segments further includes machining slots in first inner lateral faces of the inner shroud segments, first outer lateral faces of the outer shroud segments, second inner lateral faces opposite the first inner lateral faces, and second outer lateral faces opposite the first outer lateral faces.

11. The method of claim 10, wherein the assembling of the vane segments includes inserting feather seals in the slots.

12. The method of claim 1, wherein the assembling of the vane segments includes abutting each of the inner shroud segments against two adjacent ones of the inner shroud segments and abutting the outer shroud segments against two adjacent ones of the outer shroud segments.

13. The method of claim 1, further comprising installing the stator in a turbine section of the aircraft engine, the aircraft engine being devoid of variable guide vanes in the turbine section.

14. The method of claim 1, wherein the determining of the desired angle includes determining a first angle and a second angle different than the first angle, the removing of the material includes:

obtaining first vane segments having the first angle by removing material from first inner shroud raw segments of the inner shroud raw segments and first outer shroud raw segments of the outer shroud raw segments; and obtaining second vane segments having the second angle by removing material from second inner shroud raw segments of the inner shroud raw segments and second outer shroud raw segments of the outer shroud raw segments, the assembling of the vane segments includes:

assembling the first vane segments and the second vane segments in alteration around the central axis to obtain a mistuned stator.

* * * * *